United States Patent
Overton et al.

(10) Patent No.: US 6,845,637 B2
(45) Date of Patent: *Jan. 25, 2005

(54) APPARATUS TO IMPROVE DEGREE OF CURE FOR ULTRAVIOLET CURABLE OPTICAL FIBER COATING BY ACTIVELY REMOVING HEAT FROM THE COATING DURING IRRADIATION

(75) Inventors: Bob J. Overton, Lenoir, NC (US); Peter Stupak, Granite Falls, NC (US); Sammy G. Breeding, Newton, NC (US)

(73) Assignee: Alcatel, Paris (FR)

( * ) Notice: Subject to any disclaimer, the term of this patent is extended or adjusted under 35 U.S.C. 154(b) by 102 days.

This patent is subject to a terminal disclaimer.

(21) Appl. No.: 10/079,889

(22) Filed: Feb. 22, 2002

(65) Prior Publication Data

US 2002/0078888 A1 Jun. 27, 2002

Related U.S. Application Data

(62) Division of application No. 09/301,118, filed on Apr. 28, 1999, now Pat. No. 6,370,920.

(51) Int. Cl.7 ............................................. C03B 27/04
(52) U.S. Cl. ......................................... 65/510; 65/513
(58) Field of Search ........................... 65/481, 425, 434, 65/432, 513, 510; 118/620, 641–643, 67–69; 156/275.5

(56) References Cited

U.S. PATENT DOCUMENTS

| | | |
|---|---|---|
| 4,636,405 A | 1/1987 | Mensah et al. |
| 4,673,427 A | 6/1987 | Van der Giessen et al. |
| 4,770,898 A * | 9/1988 | Sugai et al. ................. 65/425 |
| 4,838,918 A | 6/1989 | Vaughan et al. |
| 4,913,859 A | 4/1990 | Overton et al. |
| 5,024,507 A | 6/1991 | Minns et al. |
| 5,028,361 A | 7/1991 | Fujimoto |
| RE33,677 E | 8/1991 | Vazirana |
| 5,171,609 A | 12/1992 | Ury |
| 5,171,634 A * | 12/1992 | Soszka et al. ............... 428/376 |
| 5,733,607 A * | 3/1998 | Mangum et al. ............. 427/512 |
| 5,763,003 A | 6/1998 | Bonicel et al. |
| 5,942,020 A * | 8/1999 | Marcelissen .................. 65/530 |
| 6,338,878 B1 * | 1/2002 | Overton et al. .............. 427/508 |
| 6,370,920 B1 * | 4/2002 | Overton et al. ............... 65/510 |
| 6,419,749 B1 * | 7/2002 | Rhoades ...................... 118/641 |
| 6,436,484 B1 * | 8/2002 | Broome et al. .............. 427/513 |
| 6,546,758 B1 * | 4/2003 | Schuepbach .................. 65/510 |
| 6,715,323 B1 * | 4/2004 | Roba et al. ................... 65/434 |

FOREIGN PATENT DOCUMENTS

EP 1312587 A2 * 5/2003 ........... C03C/25/62

OTHER PUBLICATIONS

B. J. Overton, C.R. Taylor and A.J. Muller, "The Effects of Cure Temperature on the Thermomechanical Properties of UV Curable Coatings", *Polymer Engineering and Science*, 9/89, vol. 29, No. 17, pp. 1165–1168.

(List continued on next page.)

*Primary Examiner*—Steven P. Griffin
*Assistant Examiner*—Carlos Lopez
(74) *Attorney, Agent, or Firm*—Sughrue Mion, PLLC

(57) ABSTRACT

An apparatus and method for curing a coating applied to an optical fiber. A water-jacketed UV lamp is provided adjacent a first reflector. An optical fiber is drawn between a second reflector opposite the first reflector and at least one quartz plate, while a cross flow of a cooling gas is passed around the optical fiber. Apertures may be formed in the second reflector for passing the cooling gas while the optical fiber is passed between the second reflector and the at least one quartz plate. Alternatively, two or more quartz plates may be provided and the cooling gas and the optical fiber passed between the quartz plates. The cooling gas experiences laminar flow.

49 Claims, 2 Drawing Sheets

OTHER PUBLICATIONS

H. Takase, Y. Hashiguchi, Y. Takasugi, N. Saito and T. Ukachi, "Effect of Curing Temperature on Curing Rate and Mechanical Properties of Polyurethane Acrylate Coatings for Optical Fiber", *International Wire & Cable Symposium Proceedings*, 1994, pp. 72–77.

\* cited by examiner

APPARATUS TO IMPROVE DEGREE OF CURE FOR ULTRAVIOLET CURABLE OPTICAL FIBER COATING BY ACTIVELY REMOVING HEAT FROM THE COATING DURING IRRADIATION

This is a divisional of application Ser. No. 09/301,118 filed Apr. 28, 1999, issued as U.S. Pat. No. 6,370,920; the disclosure of which is incorporated herein by reference.

BACKGROUND OF THE INVENTION

1. Field of the Invention

This invention relates to methods and apparatus for curing the coatings of optical fibers.

2. Background Art

The concept of this invention arises from experience in drawing optical fiber that demonstrates that the ultraviolet-initiated curing of the optical fiber coatings (inner, or primary coating and outer, or secondary coating) becomes difficult at high draw speeds, particularly so for the primary coating. When drawing fiber at increased speed, the reduced time in the UV irradiators (reducing the total UV dose) results in incomplete cure of the fiber coatings, particularly the soft primary coating. The first, most obvious reaction to this problem is to add UV lamps to bring the UV dose back to the level used at slower draw speed. Experience shows that this approach is not efficient in improving the cure of the primary coating at higher draw speed. There is not a simple, linear correlation between number of UV irradiators and primary coating degree of cure.

The modulus (basically the stress per unit strain at small deformations) of the primary coating is proportional to the degree to which the acrylate functional groups have reacted during cure. The reaction ties the pre-polymer molecules together through the reactive acrylate groups to build a crosslinked network. The cross-linking builds the modulus. Therefore, it is convenient to measure the modulus of the primary coating on fiber to determine the relative degree of cure of the primary coating. For primary coating cured on fiber under typical draw conditions, the modulus is typically not more than about half the modulus of the same material cured in thin films in the laboratory. One of the differences between the lab curing apparatus and the UV irradiator configuration necessary for the fiber draw towers is that the environment of the fiber in the irradiators during draw is much hotter than that of the films cured in the lab.

FIG. 1 shows the interior setup of the UV irradiator on a draw tower. The UV bulb 1 is backed by an elliptical reflector 2 positioned so that the bulb is in one of the foci of the ellipse partly defined by the reflector. The fiber F passes in front of another elliptical reflector 3 and through the other focus of the ellipse defined by the reflectors. The fiber goes through a quartz center tube 4 that is necessary to protect the fiber from the strong cross-flow of air (not shown) cooling the UV bulb (which is extremely hot). Nitrogen passes up through the center tube (in the direction indicated by arrows in FIG. 1) to provide an inert atmosphere that is conducive to good surface cure of the secondary coating.

There is a strong infrared component to the output irradiation from the UV bulb 1. This is reflected to the fiber as well as being partly absorbed by the center tube 4 (silica has a strong and broad absorbance band in the infrared). The focused irradiation and the heat from the center tube result in an increased temperature of the coating during cure, with the energy adding to the temperature rise from the exothermic cure reaction itself The high intensity UV in excess also raises the temperature of the coating. There is little opportunity for the curing coating effectively to throw off the heat until the coated fiber has exited the UV irradiators, at which point photoinitiation ceases.

An experiment was conducted to test the effects of removing the heat during cure on a draw tower. The center tube 4 in FIG. 1 was simply removed, and fiber was drawn and coated. The cross-flow of air cooling the UV bulb now also cooled the fiber. The result was that the modulus of the primary coating was made to match that of films of the coating cured in the lab. That is, the cure of the primary coating was near 100 percent.

UV lamps are available now that have reflector technology capable of removing the IR component from the spectrum of irradiation impinging on the fiber coatings. This has been shown to be of significant benefit to cure. An example of this technology is manufactured by the Iwasaki Corporation and marketed in the US by Eye Ultraviolet in Massachusetts. This company also has UV bulbs that are water-jacketed, so that much of the IR component is absorbed by water interposed between the UV generating plasma column of the bulb and the coated fiber.

Overton and Taylor (U.S. Pat. No. 4,913,859) disclose achieving an effect similar to the water jacketed bulb by using a water jacket around the center tube in the irradiator to absorb most of the infrared component of the energy impinging on the fiber coating while letting the UV component pass through. This is effective in somewhat reducing the temperature rise in the coatings due to the irradiation. However, the excess UV energy and the increase in temperature due to the chemical reaction (the exotherm) still affect the cure speed.

Mensah and Powers (U.S. Pat. No. 4,636,405) disclose the same kind of water-jacketed center tube to reduce the temperature of the coating, but expressly for the purpose of controlling coating defects induced when excessively warm primary coating on the fiber enters the cool secondary coating applicator. The mismatch in temperature causes the secondary coating prepolymer to adhere poorly to the primary coating already on the fiber, and the secondary coating applies with lumps and neckdowns and bubbles that must be cut from the fiber later.

Prior work in the field has shown that elevated temperature can retard the development of the desired cross-link structure of the optical fiber primary coating[1,2]. No other commercial UV curable material has been reported as behaving this way, because the optical fiber primary coating is singular among UV-curable materials in its physical properties (being very soft and with such a low glass transition temperature). The optical fiber secondary coating, for example, typically shows an increased rate of polymerization at higher temperature. Two mechanisms unique to the primary coating account for the effect of high temperature on its polymerization rate.

[1] B. J. Overton, C. R. Taylor, A. J. Muller, *Polymer Engineering and Science* 29, 1165, (1989)

[2] H. Takase, Y. Hashiguchi, Y. Takasugi, N. Saito, T. Ukachi, *Proceedings of the International Wire and Cable Symposium*, 72, 1994

The composition of an optical fiber coating pre-polymer comprises an oligomer that is end-capped with, for example, acrylate functional groups. Other reactive species may be used, such as vinyl ether groups. The functional groups are capable of reacting through a free-radical mechanism. The oligomer is of high viscosity and must be diluted to allow application to fiber in the draw process. In order to avoid solvents for dilution, low viscosity monomers containing reactive functional groups are used. The monomers may contain one or more reactive groups. If a monomer contains only one reactive group, it does not add to the cross-link density of the cured material. If it contains more than one reactive group per monomer molecule, it adds to the cross-link density and thus to the modulus of the cured material.

In order to obtain soft, buffer materials useful for primary coatings (where the room temperature Young's modulus is normally less than about 3 MPa on fiber), the oligomers are usually of much higher molecular weight than those used for tough, hard secondary coatings. The oligomer backbone chemistry is chosen to be highly flexible rather than rigid in nature. Additionally, mono-functional diluents are substituted for multi-functional diluents. These choices of raw materials for primary coatings result in the low cross-link density and flexibility necessary to buffer the fiber against stresses from external sources and to remain soft at low temperatures for protection against temperature-induced stresses that cause microbending in the fiber and loss of signal. At the same time, these deliberate choices in raw materials result in primary coating prepolymer mixtures that are quite low in reactive functional group concentration by comparison with the optical fiber secondary coating prepolymer or with virtually any other UV curable prepolymer in use for any other application. The effect of the low reactive functional group concentration and the high molecular weight or long-chain oligomers in primary coating prepolymers is to isolate the photoinitiator in molecular "cages" where they are inefficient in starting the polymerization reaction to create the cross-linked network of the primary coatings. The photoinitiator, once activated by absorption of the UV energy, is likely to react with itself before initiating the desired reaction, due to its relative isolation. Further, since the propagation rate of the polymerization process is directly proportional to the concentration of reactive functional groups, this step in the cure of primary coatings is slower than it is in the cure of other photoreactive materials. Thus, optical fiber primary coatings are inherently quite difficult to cure adequately in fiber draw processes.

The effect of high temperature in retarding the development of the cross-linked structure also appears to be related to the low concentration of reactive functional groups. Because of the scarcity of reactive groups, the free radicals existing in the propagation stage of coating cure are more likely to terminate through recombination with other free radicals, either photoinitiator fragments or propagating chains, or to undergo chain transfer of the radicals on a non-productive course. Therefore, it is beneficial to keep the temperature of the primary coating from rising significantly while the coating is curing.

Since the cure reaction proceeds at an extremely high rate, it is necessary to take steps to remove the heat from the primary coating during irradiation in order to avoid taking additional space on draw towers to cool and re-irradiate the coating repeatedly to achieve adequate cure. There currently is no solution available that addresses this need in a satisfactory manner or degree.

SUMMARY OF THE INVENTION

It is therefore an object of the invention to solve the above mentioned problems of the background art.

The basis of the present invention is a modification of the irradiator to configure an aperture or window arrangement that protects the fiber from the airflow necessary to cool the UV lamp, while providing a cross-flow of clean cooling gas, for example such as nitrogen or helium, that effectively removes the heat of reaction from the coating on the fiber and the heat that results from absorption by the coating of excess radiant energy. The invention thus increases the efficiency of the photoinitiators and favors the desired network-building cross-link reactions in the coating.

An advantage of the present invention is that it allows significantly higher line speeds for the manufacture of coated optical fiber without the need to utilize more space on production equipment for additional UV irradiators and cooling between them that would otherwise be required.

DETAILED DESCRIPTION OF THE PREFERRED EMBODIMENTS

Figure 2:
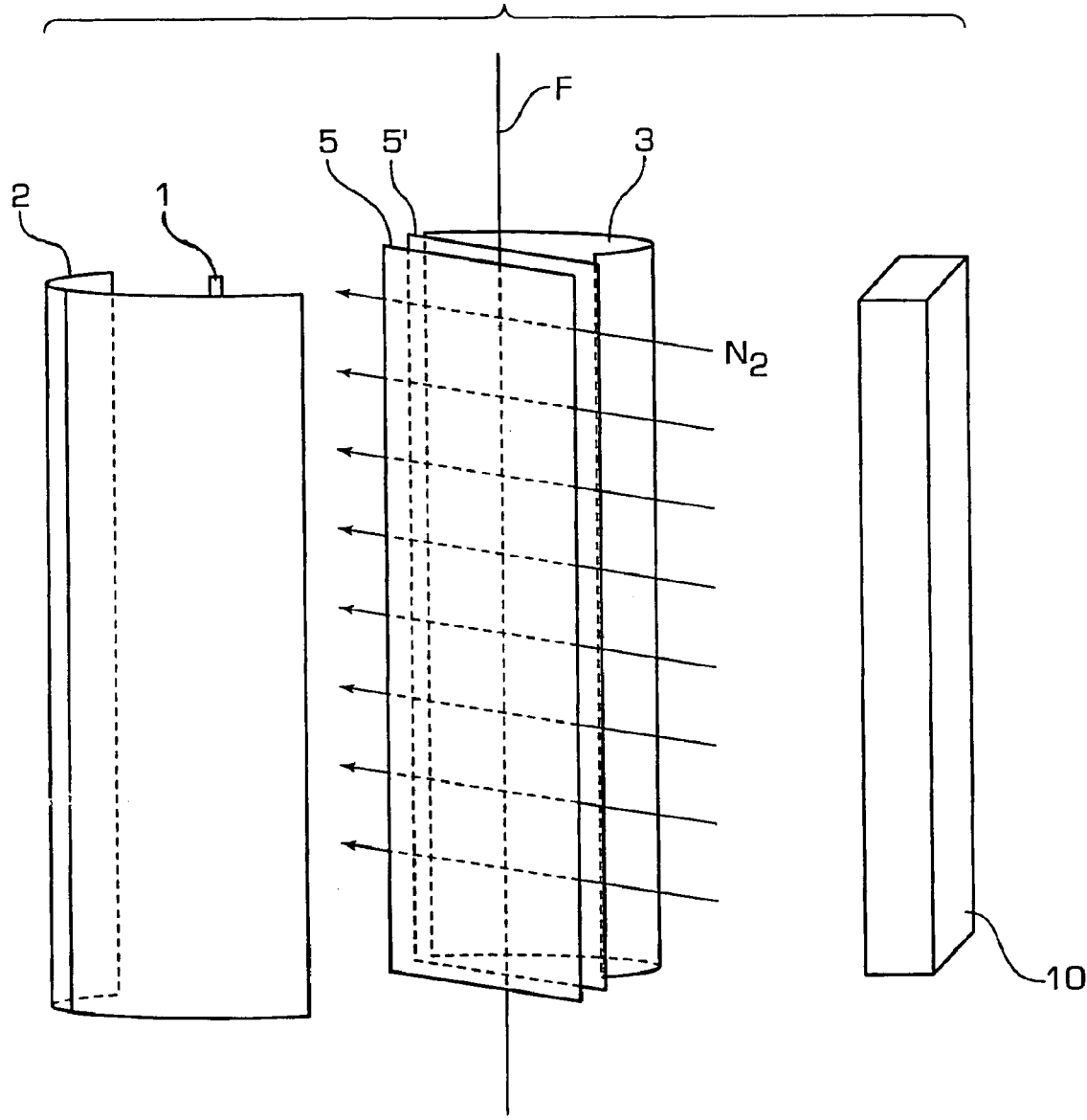
FIG. 2 shows the configuration of a UV irradiator in one embodiment of the present invention.

As shown in FIG. 2, the center tube of the background art is replaced by parallel plates 5,5" of quartz spaced between 1 mm and 100 mm apart. The flow of air cooling the UV lamp itself is prevented from passing over the fiber by the presence of the parallel quartz plates and by re-directing the entrance for the flow of air cooling the UV lamp. A separate flow of air is provided in order to cool the second reflector and the part of the irradiator housing behind it. A cross-flow of cooling gas, such as nitrogen, helium or air (indicated by arrows in FIG. 2), is directed between the plates 5, 5' and across the coated fiber to actively remove the heat from the coating, for the purpose of increasing the effectiveness of the cure mechanism (the sum of the photoinitiator efficiency, polymerization rate, termination rate). In FIG. 2, the reflectors are designated by reference number 2, 3, the UV lamp is designated by reference number 1, and the optical fiber is designated by reference character F.

A significant advantage of the present invention over the '859 patent to Overton and Taylor is that laminar cross-flow is used for active cooling rather than turbulent flow inside a tube. Further, unlike the '405 patent to Mensah and Powers, the purpose is to improve the cure speed of the coating rather than prevent coating defects.

Figure 1:
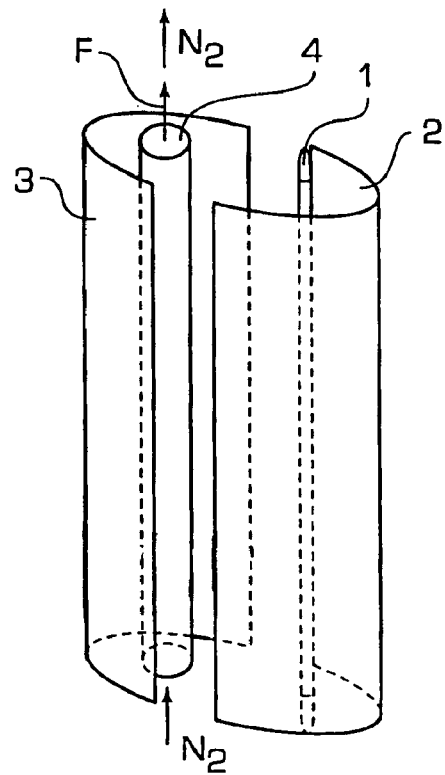
FIG. 1 shows the arrangement of a lamp (or bulb), reflectors, center tube and fiber in a standard UV cure irradiator for optical fiber coatings.
Figure 3:
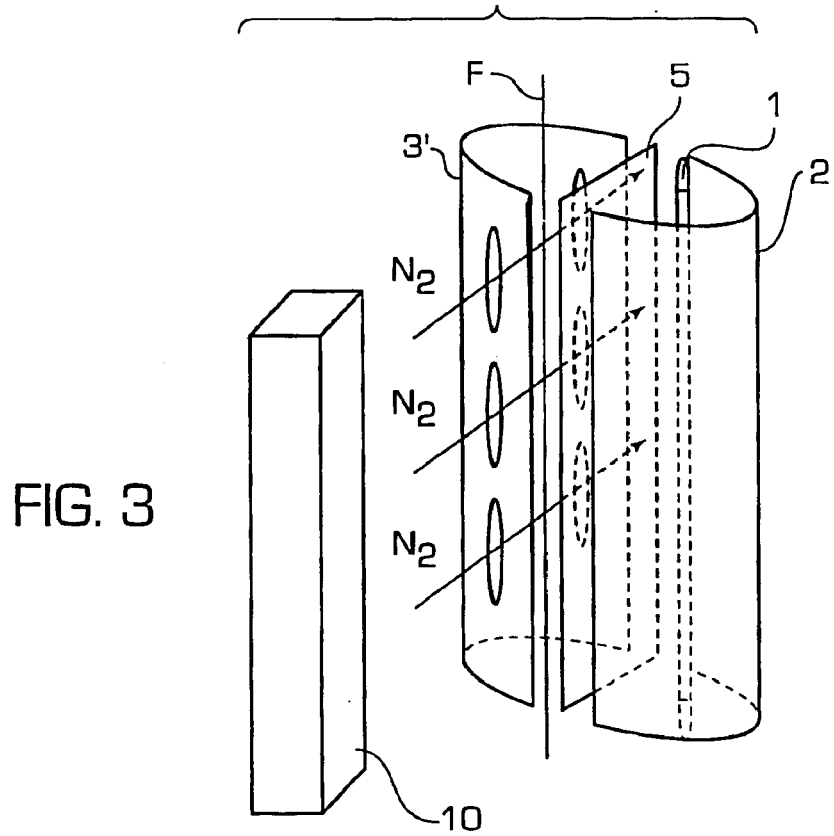
FIG. 3 shows the configuration of a UV irradiator in another embodiment of the present invention.

In the FIG. 3 embodiment, there is only one quartz plate 5, and the optical fiber F passes between a reflector 3' and the quartz plate 5. The reflector 3' has aligned apertures through which a cooling gas such as nitrogen, helium or air is directed under laminar flow, in order to actively remove heat from the coating as in the first embodiment. The UV bulb 1 and the other reflector 2 are disposed on the opposite of the quartz plate 5 from the fiber F and reflector 3'.

In another embodiment, the quartz plates 5 and 5' in the above embodiments of FIGS. 2 and 3 may be coated with a combination of materials that are transparent to UV wavelengths but reflective of infrared wavelengths. This provides additional protection against the temperature rise in the curing coating on fiber F by removing some of the excess energy from the spectrum impinging on the coating in the irradiators and, therefore, reducing the heat that must be removed by the laminar cross-flow of cooling gas over the fiber F.

In another embodiment, the reflectors 3 and 3' in FIGS. 2 and 3 may be coated with a combination of materials that reflect the UV portion of the spectrum but absorb or are transparent to the infrared component of the energy from the UV lamp. Again, this provides additional protection against the temperature rise in the curing coating and reduces the heat that must be removed by the laminar cross-flow of cooling gas over the fiber F.

In another embodiment, the UV lamp in FIGS. 2 and 3 may be constructed so that the quartz bulb contains a double wall through which water is circulated to both cool the bulb and remove a portion of the infrared spectrum from the energy output impinging on the coated fiber. The temperature rise in the curing coatings may be reduced in this way and increase the efficiency of the laminar cross-flow cooling the fiber F.

We claim:

1. An apparatus for accelerating the curing of a coating applied to an optical fiber by actively removing the heat of the exothermic cure reaction during UV irradiation, said apparatus comprising:
   a UV lamp;
   at least two reflectors, wherein at least one of said at least two reflectors is positioned adjacent to said UV lamp; and
   means for providing a flow of a cooling gas across a coated optical fiber while said coated optical fiber is adjacent to said at least one of said at least two reflectors, wherein said flow of gas is laminar.

2. The apparatus according to claim 1, wherein said flow of gas is substantially perpendicular to a draw direction of said coated optical fiber.

3. The apparatus according to claim 1, further comprising:
   at least one quartz plate located adjacent to said at least one reflector such that said coated optical fiber passes between said at least one reflector and said at least one quartz plate.

4. The apparatus according to claim 3, wherein said at least one reflector has a plurality of pairs of apertures disposed opposite each other through which said gas flows.

5. The apparatus according to claim 3, wherein said quartz plate is coated with a material that allows UV energy to pass through but reflects at least some of an infrared component of an irradiation spectrum.

6. The apparatus according to claim 1, wherein said at least one reflector comprises a material that reflects UV energy and absorbs or allows to pass through an infrared component of an irradiation spectrum.

7. The apparatus according to claim 1, further comprising:
   at least two quartz plates positioned adjacent to said at least one reflector such that said coated optical fiber passes between said at least two quartz plates.

8. The apparatus according to claim 7, wherein said flow providing means further comprises an airflow device which provides said flow of said gas across said coated optical fiber between said at least two quartz plates.

9. The apparatus according to claim 8, wherein said flow is substantially perpendicular to a draw direction of said coated optical fiber.

10. The apparatus according to claim 7, wherein said at least two quartz plates are spaced apart by about 1 mm to about 100 mm.

11. The apparatus according to claim 7, wherein at least one of said quartz plates is coated with a material that allows UV energy to pass through but reflects at least some of an infrared component of an irradiation spectrum.

12. The apparatus according to claim 7, wherein said at least one reflector comprises a material that reflects UV energy and absorbs or allows to pass through an infrared component of an irradiation spectrum.

13. An apparatus for accelerating the curing of a coating applied to an optical fiber by actively removing the heat of the exothermic cure reaction during UV irradiation, said apparatus comprising:
    a UV lamp;
    at least two reflectors, wherein at least one of said at least two reflectors is positioned adjacent to said UV lamp; and
    a gas flow apparatus to provide a flow of a cooling gas across a coated optical fiber while said coated optical fiber is adjacent to said at least one of said at least two reflectors, wherein said gas flow apparatus provides a laminar gas flow.

14. The apparatus according to claim 13, wherein said gas flow apparatus provides a gas flow substantially perpendicular to a draw direction of said coated optical fiber.

15. The apparatus according to claim 13, wherein said gas flow apparatus comprises:
    at least one quartz plate located adjacent to said at least one reflector such that said coated optical fiber passes between said at least one reflector and said at least one quartz plate.

16. The apparatus according to claim 15, wherein said at least one reflector has a plurality of pairs of apertures disposed opposite each other through which said gas flows.

17. The apparatus according to claim 15, wherein said quartz plate is coated with a material that allows UV energy to pass through but reflects at least some of an infrared component of an irradiation spectrum.

18. The apparatus according to claim 13, wherein said at least one reflector comprises a material that reflects UV energy and absorbs or allows to pass through an infrared component of an irradiation spectrum.

19. The apparatus according to claim 13, wherein said gas flow apparatus comprises:
    at least two quartz plates positioned adjacent to said at least one reflector such that said coated optical fiber passes between said at least two quartz plates.

20. The apparatus according to claim 19, wherein said gas flow apparatus provides said gas flow between said at least two quartz plates.

21. The apparatus according to claim 20, wherein said flow is substantially perpendicular to a draw direction of said coated optical fiber.

22. The apparatus according to claim 19, wherein said at least two quartz plates are spaced apart by about 1 mm to about 100 mm.

23. The apparatus according to claim 19, wherein at least one of said quartz plates is coated with a material that allows UV energy to pass through but reflects at least some of an infrared component of an irradiation spectrum.

24. The apparatus according to claim 19, wherein said at least one reflector comprises a material that reflects UV energy and absorbs or allows to pass through an infrared component of an irradiation spectrum.

25. An apparatus for accelerating the curing of a coating applied to an optical fiber by actively removing the heat of the exothermic cure reaction during UV irradiation, said apparatus comprising:
    a UV lamp;
    at least two reflectors, wherein at least one of said at least two reflectors is positioned adjacent to said UV lamp;
    means for providing a flow of a cooling gas across a coated optical fiber while said coated optical fiber is adjacent to said at least one of said at least two reflectors; and at least one quartz plate located adjacent to said at least one reflector such that said coated optical fiber passes between said at least one reflector and said at least one quartz plate.

26. The apparatus according to claim 25, wherein said at least one reflector has a plurality of pairs of apertures disposed opposite each other through which said gas flows.

27. The apparatus according to claim 25, wherein said flow of gas is laminar.

28. The apparatus according to claim 25, wherein said quartz plate is coated with a material that allows UV energy to pass through but reflects at least some of an infrared component of an irradiation spectrum.

29. An apparatus for accelerating the curing of a coating applied to an optical fiber by actively removing the heat of the exothermic cure reaction during UV irradiation, said apparatus comprising:
a UV lamp;
at least two reflectors, wherein at least one of said at least two reflectors is positioned adjacent to said UV lamp;
means for providing a flow of a cooling gas across a coated optical fiber while said coated optical fiber is adjacent to said at least one of said at least two reflectors; and
at least two quartz plates positioned adjacent to said at least one reflector such that said coated optical fiber passes between said at least two quartz plates.

30. The apparatus according to claim 29, wherein said flow providing means further comprises an airflow device which provides said flow of said gas across said coated optical fiber between said at least two quartz plates.

31. The apparatus according to claim 30, wherein said flow is substantially perpendicular to a draw direction of said coated optical fiber.

32. The apparatus according to claim 29, wherein said at least two quartz plates are spaced apart by about 1 mm to about 100 mm.

33. The apparatus according to claim 32, wherein said flow is laminar.

34. The apparatus according to claim 29, wherein at least one of said quartz plates is coated with a material that allows UV energy to pass through but reflects at least some of an infrared component of an irradiation spectrum.

35. The apparatus according to claim 34, wherein said flow of cooling gas is laminar across said coated optical fiber.

36. The apparatus according to claim 29, wherein said at least one reflector comprises a material that reflects UV energy and absorbs or allows to pass through an infrared component of an irradiation spectrum.

37. An apparatus for accelerating the curing of a coating applied to an optical fiber by actively removing the heat of the exothermic cure reaction during UV irradiation, said apparatus comprising:
a UV lamp;
at least two reflectors, wherein at least one of said at least two reflectors is positioned adjacent to said UV lamp; and
a gas flow apparatus to provide a flow of a cooling gas across a coated optical fiber while said coated optical fiber is adjacent to said at least one of said at least two reflectors, wherein said gas flow apparatus comprises:
at least one quartz plate located adjacent to said at least one reflector such that said coated optical fiber passes between said at least one reflector and said at least one quartz plate.

38. The apparatus according to claim 37, wherein said at least one reflector has a plurality of pairs of apertures disposed opposite each other through which said gas flows.

39. The apparatus according to claim 38, wherein said flow is laminar.

40. The apparatus according to claim 37, wherein said quartz plate is coated with a material that allows UV energy to pass through but reflects at least some of an infrared component of an irradiation spectrum.

41. An apparatus for accelerating the curing of a coating applied to an optical fiber by actively removing the heat of the exothermic cure reaction during UV irradiation, said apparatus comprising:
a UV lamp;
at least two reflectors, wherein at least one of said at least two reflectors is positioned adjacent to said UV lamp; and
a gas flow apparatus to provide a flow of a cooling gas across a coated optical fiber while said coated optical fiber is adjacent to said at least one of said at least two reflectors, wherein said gas flow apparatus comprises:
at least two quartz plates positioned adjacent to said at least one reflector such that said coated optical fiber passes between said at least two quartz plates.

42. The apparatus according to claim 41, wherein said gas flow apparatus provides said gas flow between said at least two quartz plates.

43. The apparatus according to claim 42, wherein said flow is substantially perpendicular to a draw direction of said coated optical fiber.

44. The apparatus according to claim 41, wherein said at least two quartz plates are spaced apart by about 1 mm to about 100 mm.

45. The apparatus according to claim 44, wherein said flow is laminar.

46. The apparatus according to claim 41, wherein at least one of said quartz plates is coated with a material that allows UV energy to pass through but reflects at least some of an infrared component of an irradiation spectrum.

47. The apparatus according to claim 46, wherein said flow is laminar.

48. The apparatus according to claim 41, wherein said at least one reflector comprises a material that reflects UV energy and absorbs or allows to pass through an infrared component of an irradiation spectrum.

49. An apparatus for accelerating the curing of a coating applied to an optical fiber by actively removing the heat of the exothermic cure reaction during UV irradiation, said apparatus comprising:
a UV lamp;
at least two reflectors, wherein at least one of said at least two reflectors is positioned adjacent to said UV lamp, and wherein said coating is cooled during curing by providing a flow of gas across said optical fiber while said optical fiber is adjacent to said at least one of said at least two reflectors; and
a gas flow apparatus to provide a flow of a cooling gas across a coated optical fiber while said coated optical fiber is adjacent to said at least one reflector, wherein said flow of gas is laminar.

* * * * *